United States Patent Office 3,469,002
Patented Sept. 23, 1969

3,469,002
BACTERICIDAL COMPOSITIONS CONTAINING 6-ACETOXY - 2,4 - DIMETHYL-m-DIOXANE AND A FORMALDEHYDE DONOR AND PRODUCTS CONTAINING SUCH
Wendell W. Moyer, Jr., Glen Ellyn, and Wayne E. Molenda, Northlake, Ill., assignors to Daubert Chemical Company, Oak Brook, Ill., a corporation of Illinois
No Drawing. Filed Oct. 23, 1965, Ser. No. 504,104
Int. Cl. A61l *13/02, 3/00*
U.S. Cl. 424—27         3 Claims

ABSTRACT OF THE DISCLOSURE

Volatile bactericidal compositions, and articles such as sheet material, especially paper, packaging material, and the like, carrying or embodying the volatile compositions, the vapors of which are gradually released, in use, to effect destruction of bacteria, fungi, and the like. The preferred compositions contain as their essential active ingredients a mixture of paraformaldehyde, or other active formaldehyde donor, and 6-acetoxy-2,4-dimethyl-m-dioxane otherwise known as "Dioxin."

---

The present invention relates to volatile bactericidal compositions, and to articles such as sheet material, especially paper, packaging material, and the like, carrying or embodying the volatile compositions, the vapors of which are gradually released, in use, to effect destruction of bacteria, fungi, and the like. In one of its more specific aspects, the present invention relates to volatile bactericidal compositions containing as their essential active ingredients a synergistic combination of paraformaldehyde, or other active formaldehyde donor, and 6-acetoxy-2,4-dimethyl-m-dioxane or "Dioxin" (Sindar Corporation).

It has heretofore been suggested to embody volatile bactericidal agents in sheet material. However, so far as is known, no such material has come into any significant commercial use. Those materials which have been proposed, generally speaking, possessed a number of disadvantages such as inadequate bactericidal activity, too rapid dissipation of the volatile agent utilized, undesirable properties with respect to odor and appearance, as well as others.

It has been found, in accordance with the present invention, that sheet materials embodying volatile bactericidal agents can be prepared which have outstandingly satisfactory properties and characteristics. The objectives of this invention are achieved by combining paraformaldehyde, or other active formaldehyde vapor donating agent, with certain known volatilizable bactericidal agents, in specified proportions as hereafter described in detail, and embodying them in sheet material, especially paper, to provide products which gradually release bactericidal vapors to effect destruction of bacteria, fungi, and the like, over a prolonged period of time at ambient or room temperatures. Exemplary of another formaldehyde donor having utility for the purposes of this invention is trioxane.

Paraformaldehyde is known to have excellent bactericidal properties. However, it has certain properties which militate against its use, as the sole source of formaldehyde vapors, in various environments, especially in sheet material such as paper. Thus, for example, the paraformaldehyde volatilizes slowly, its half-life on uncoated paper, for instance, being of the order of several days, and the formaldehyde vapors it gives off have a pungent, offensive odor. Furthermore, there are limitations as to the amount of paraformaldehyde that can be incorporated into paper. Generally speaking, loadings of paraformaldehyde in paper above one gram per square foot produce a dusty, caked effect in the paper, making it unsatisfactory for most commercial uses.

The bactericidal compositions of the present invention not only enable the full bactericidal potential of paraformaldehyde, and other active formaldehyde donors to be realized, but in certain cases greatly enhance their bactericidal properties while concomitantly substantially eliminating their undesirable properties. The bactericidal agents used in combination with the formaldehyde donor in accordance with the practice of this invention, generally speaking, are characterized in that they are compatible with the formaldehyde donor at ambient temperatures, having a volatility at said temperatures which is substantially the same as, or, especially desirably, greater than that of the formaldehyde donor, and are capable of masking to an appreciable extent the pungent odor of formaldehyde vapors furnished by the donor while either itself, or in combination with a suitable deodorant, imparting an agreeable odor to the combination. Exemplary of bactericidal agents having utility for the purposes of this invention are Dioxin, ethyl benzoate, methyl benzoate, methyl p-hydroxy-benzoate, and the like. Of the volatile bactericidal agents employed in the compositions of this invention Dioxin is of especial importance to the attainment of the objectives of this invention.

The proportions of formaldehyde donor used in the bactericidal compositions of the present invention are variable. Thus, effective results can be attained with compositions having ratios of the donor to volatile bactericidal agent of from 9:1 to 1:9. Generally speaking, however, it is preferred to employ formaldehyde donor to volatile bactericidal agent ratios in the range of from about 3:1 to about 1:3, especially desirably from about 2:1 to 1:1.

In accordance with the particularly preferred aspects of this invention, the bactericidal compositions are formulated of an active formaldehyde donor, particularly paraformaldehyde, and Dioxin. The vapors of Dioxin, unlike those of paraformaldehyde, have a relatively agreeable odor. In addition, Dioxin volatilizes rapidly, evincing a half-life in uncoated paper of the order of about one hour compared to several days in the case of paraformaldehyde. In addition, as in the case of paraformaldehyde, there are limitations on the quantity of Dioxin that can be loaded into paper. Thus, Dioxin loaded into paper at a level in excess of one gram per square foot yields a wet, limp product which is unsuitable for many commercial purposes.

In accordance with the present invention, it has been discovered that bactericidal compositions formulated of an active formaldehyde donor, such as paraformaldehyde, and Dioxin as taught herein, not only enable the attainment of combined-weight loadings in paper of paraformaldehyde and Dioxin in excess of one gram per square foot of paper and a gradual release, in use, of vapors to provide effective bactericidal action over a prolonged period of time, but, and quite surprisingly, manifest bactericidal action which is greater than the mere total of the individual effects of the individual ingredients. Furthermore, the compositions thus formulated have a pleasant odor suggestive of that of the vapors of Dioxin. The masking effect of Dioxin of the odor of the paraformaldehyde vapors is in fact so pronounced that the effect is evident long after the bulk of the Dioxin has volatilized. While the actual mechanism of the potentiating or synergistic activity, and odor masking phenomenon, of the paraformaldehyde-Dioxin compositions have not been determined, their unique conjoint activity is clearly observable.

The relative proportions of paraformaldehyde to Dioxin employed to attain the aforementioned synergistic effects are somewhat variable. Generally speaking, they are attained with compositions having concentrations, basis weight, ranging from about 75% of paraformaldehyde and about 25% of Dioxin to from about 60% of Dioxin and about 40% of paraformaldehyde, with especially effective results being attainable at weight concentration in combination ranging from about 55% of paraformaldehyde and 45% of Dioxin to from about 55% of Dioxin and about 45% paraformaldehyde. It will be understood that concentrations of paraformaldehyde and Dioxin below or above the ranges just set out will provide bactericidal activity. However, from the standpoint of certain practical considerations, especially in utilizing the compositions in connection with paper or articles formed from paper, the stated concentrations ranges are preferred. Also, it will be understood that other compatible, bactericidal agents, in any desired concentration, may be combined with the paraformaldehyde-Dioxin compositions of this invention without impairment of the unique activity of the compositions.

As indicated hereinabove, the volatile bactericidal compositions of this invention are especially suitable for use in connection with sheet material such as paper, and articles fabricated therefrom. When incorporated into paper, for example, the vapors of the compositions are gradually released in bactericidally effective concentration over a prolonged period under ambient or room conditions. This activity of the compositions can be effectively utilized in such articles as hospital bags, liners for trash and disposal cans, disinfecting bags for contaminated articles including brushes, combs, telephones, and the like, packaging for sterile objects, hospital shelf liners, and so forth.

The bactericidal compositions can be applied either directly to the paper in accordance with known paper impregnation techniques, or they can first be incorporated into a suitable paper coating substance which is then applied to paper by any of several conventionally used paper coating procedures. In applying the compositions directly to paper, it is advantageous to utilize an open-fibre paper of sufficient weight per ream to enable an effective quantity of the compositions to be impregnated therein. Thus, for example, in utilizing a composition comprised of paraformaldehyde and Dioxin, especially effective results have been obtained with bleached kraft paper having a weight of from 70 to 100 pounds per ream. The paper, whether embodying the compositions, or carrying a paper coating substance in which the compositions have been admixed, can be provided with a liner or film base which is essentially resistant, impenetratable or impermeable to the passage therethrough of the vapors of the volatile bactericidal compositions to insure that the vapors will not be dissipated into the atmosphere but will pass from the paper, or the paper coating substance, to areas where a bactericidal atmosphere is desired. Various materials, including paraffin and other waxes, cellulose acetate, polyvinylidene chloride (Saran), ethylene glycol-terephthalic acid polymers (Mylar), polyethylene, metal foil such as aluminum foil, and the like, can be used as a liner or film base for this purpose.

The quantity of the volatile bactericidal compositions of this invention employed in making bactericidal sheet material, particularly paper, in accordance with the practice of this invention can be varied within relatively wide limits, depending upon the ultimate form of the article and the use to which the article is put. Thus, for example, lower weight loadings of the compositions may be used with effective results if a vapor impervious liner or film base is present on the paper article. The same is applicable to articles for use in an enclosed area where dissipation of the bactericidal vapors into the atmosphere is physically prevented or retarded.

Generally speaking, the volatile bactericidal compositions, when embodied either in the paper per se or a coating substance applied to paper, are utilized in an amount sufficient to constitute, by weight, from about 0.4 gram to about 2 grams per square foot of paper area, with especially effective results being obtained with amounts ranging from about 1.5 to about 1.8 grams per square foot of paper area. In utilizing compositions based on paraformaldehyde and Dioxin, especially satisfactory results are attainable with weight loadings ranging from about 0.8 to 1 gram of paraformaldehyde and 0.8 to 1 gram of Dioxin per square foot on bleached kraft paper having a weight of 70 pounds per ream.

In determining the synergistic activity of the paraformaldehyde-Dioxin composition of this invention, three one square inch pieces of paper, weight loaded at a level of 1 gram of Dioxin and 0.8 gram of paraformaldehyde per square foot of area, were placed into separate petri dishes containing 10 ml. of nutrient agar inoculated with 2 ml. of a 72 hour subculture of *E. coli*, the inoculated petri dishes having first been incubated after inoculation at 35° C. for 24 hours. Similar sized pieces of paper, three of which had a weight loading of 1.9 grams of paraformaldehyde per square foot of area, and the other three of which had a weight loading of 1.9 grams of Dioxin per square foot of area, were each placed in separate petri dishes prepared as indicated. After one hour of exposure to the pieces of paper weight loaded as described, the pieces of paper in one set of dishes was removed and the dishes were incubated for 24 hours. One set of three petri dishes was then examined. The petri dish which contained the paper loaded with the paraformaldehyde and Dioxin composition at the level indicated showed a kill of 99.9% compared to 95% for the other papers. The same procedure was followed after 3 hours with another set of dishes. The petri dish which contained the paraformaldehyde-Dioxin composition showed a 100% kill compared to a 95% kill for each of the other papers. At 5 hours, the paraformaldehyde-Dioxin composition showed a 100% kill compared to a 92% kill for the other papers.

Additives such as odorants, deodorants, perfumes, and the like, may, if desired, be incorporated into the compositions of this invention. In addition, other bactericidal or fungicidal agents compatible with the compositions, may be added where desired.

It should be understood that while the compositions have been described with reference to their particular utility in connection with paper articles, the compositions can be incorporated into such other materials as plastics, wood, composites, and the like, to produce similar effects.

The following are specific illustrative examples of the compositions of this invention:

Example 1

| Ingredients: | Wt. percent |
|---|---|
| Paraformaldehyde | 70 |
| Dioxin | 30 |

Example 2

| | |
|---|---|
| Paraformaldehyde | 50 |
| Dioxin | 45 |
| Methyl benzoate | 5 |

Example 3

| | |
|---|---|
| Paraformaldehyde | 75 |
| Ethyl benzoate | 25 |

Example 4

| | |
|---|---|
| Paraformaldehyde | 55 |
| Dioxin | 45 |

Example 5

| | |
|---|---|
| Trioxane | 70 |
| Dioxin | 30 |

What is claimed is:

1. A bactericidal paper embodying a bactericidally effective concentration of a bactericidal composition containing as its essential active ingredients a synergistic combination of paraformaldehyde and 6-acetoxy-2,4-dimethyl-m-dioxane, the concentration, by weight, of paraformaldehyde and said dioxane ranging from about 55% paraformaldehyde and 45% of the said dioxane to about 55% of the said dioxane and 45% of the paraformaldehyde.

2. A bactericidal composition having utility as an impregnant for a bactericidal paper comprising a synergistic mixture of paraformaldehyde and 6-acetoxy-2,4-dimethyl-m-dioxane, the concentration, by weight, of paraformaldehyde and said dioxane in the composition ranging from about 55% of paraformaldehyde and 45% of said dioxane to about 45% of paraformaldehyde and 55% of said dioxane.

3. A bactericidal paper containing a bactericidally effective concentration of a bactericidal composition containing as its essential active ingredients a synergistic mixture of paraformaldehyde and 6-acetoxy-2,4-dimethyl-m-dioxane, the weight loading of the bactericidal composition in the paper ranging from about 0.8 to 1 gram of the paraformaldehyde per square foot of paper area to about 1 to 0.8 gram of 6-acetoxy-2,4-dimethyl-m-dioxane per square foot of paper area.

References Cited
UNITED STATES PATENTS

| | | | |
|---|---|---|---|
| 2,474,227 | 6/1949 | Coleman | 117—154 |
| 2,480,010 | 8/1940 | Flett | 117—154 |
| 2,746,872 | 5/1956 | Mispley | 117—154 |
| 3,167,477 | 1/1965 | Gump | 167—33 |
| 3,227,614 | 1/1966 | Scherer | 117—154 |

OTHER REFERENCES

Merck Index, 7th edition, (1960), p. 772–773.

ALBERT T. MEYERS, Primary Examiner

S. J. FRIEDMAN, Assistant Examiner

U.S. Cl. X.R.

117—152, 154; 424—278, 333, 334